United States Patent [19]
Uemura et al.

[11] Patent Number: 5,694,509
[45] Date of Patent: Dec. 2, 1997

[54] OPTICAL COUPLER

[75] Inventors: Yasuo Uemura; Etuo Umehara; Kazuyuki Fukumura, all of Tokyo, Japan

[73] Assignee: The Furukawa Electric Co., Ltd., Tokyo, Japan

[21] Appl. No.: 749,276

[22] Filed: Nov. 13, 1996

[30] Foreign Application Priority Data

Nov. 13, 1995 [JP] Japan .................. 7-294047

[51] Int. Cl.⁶ .................................................. G02B 6/38
[52] U.S. Cl. .................. 385/99; 385/96; 385/51; 385/43
[58] Field of Search .................. 385/95, 96, 99, 385/43, 51

[56] References Cited

U.S. PATENT DOCUMENTS

| | | | |
|---|---|---|---|
| 5,208,883 | 5/1993 | Hattori et al | 385/43 |
| 5,261,018 | 11/1993 | Suganuma et al. | 385/51 |
| 5,430,821 | 7/1995 | Sasoka et al. | 385/99 |
| 5,479,548 | 12/1995 | Cote et al. | 385/51 |

*Primary Examiner*—John Ngo
*Attorney, Agent, or Firm*—Jacobson, Price, Holman & Stern, PLLC

[57] ABSTRACT

An optical coupler to be used for optical telecommunications is disclosed, characterized by portions of exposed optical fiber sections located immediately adjacent to and outside the respective clots of the first adhesive agent as viewed from the welded optical fiber section being coated by a third adhesive agent having a Young's modulus smaller than that of the first adhesive agent. It comprises exposed optical fiber sections formed by removing the coating layer of each of a plurality of coated optical fibers for a given length; a welded optical fiber section formed by welding together and stretching portions of said exposed optical fiber sections; an inner reinforcing member accompanying said welded optical fiber section; and an outer reinforcing member housing said exposed optical fiber sections, the welded optical fiber section and the end sections of the coating layers; the inner reinforcing member and said exposed optical fiber sections being held to each other by means of a first adhesive agent; the outer reinforcing member and the exposed optical fiber sections or the coating layers being rigidly held to each other by means of a second adhesive agent.

1 Claim, 5 Drawing Sheets

OPTICAL COUPLER

BACKGROUND OF THE INVENTION

1. [Field of the Invention]

This invention relates to an optical coupler to be suitably used for optical telecommunications.

2. [Prior Art]

Optical couplers are known for coupling and branching optical paths for optical telecommunications. FIG. 8 of the accompanying-drawings illustrates an optical fiber cable realized by fusing and elongating a plurality of optical fibers and FIGS. 9 through 11 illustrate a known optical coupler for such optical fiber cables.

Referring to FIG. 8, the optical cable comprises a plurality of coated optical fibers 3 (two in FIG. 8), each having an optical fiber 1 and a coating layer 2. Each of the coated optical fibers 3 has an exposed optical fiber section 4 produced by removing the coating layer 2 for a given length, part of which is fused and elongated to form a welded optical fiber section 5. Note that the portions of the exposed optical fiber sections 4 that are not welded are referred to as exposed optical fiber sections 4' hereinafter for the sake of convenience In the known optical coupler, the welded optical fiber section 5 is rigidly held to a panel-shaped inner reinforcing member 6 that is typically made of glass by means of first adhesive agent 8 that is typically made of a resin material capable of being set by ultraviolet rays as shown in FIGS. 9 and 10

The exposed optical fiber sections 4, oppositely disposed end portions of the coating layers 2 and the inner reinforcing member 6 are housed in a cylindrical outer reinforcing member 7 typically made of glass and the outer reinforcing member 7 and the exposed optical fiber sections 4' or the oppositely disposed end portions of the coating layer 2 are bonded together by means of a second adhesive agent 9 as shown in FIGS. 9 and 11.

Note that a herd material having a large Young's modulus is used for the first adhesive agent 8 in order to securely hold the welded optical fiber section 5 to the inner reinforcing member 6.

With the above described known optical coupler, however, the exposed optical fiber sections 4' are pulled obliquely relatively the longitudinal direction of the welded optical fiber section 5 and rigidly held to the inner reinforcing member 6 by means of the hard fire adhesive agent 8 so that portions of the exposed optical fiber sections 4' located immediately adjacent to and outside the respective clots of the first adhesive agent 8 as viewed from the welded optical fiber section 5 (the portions indicated by a in FIG. 9, where are referred to simply as portions adjacent to the first adhesive agent 8) are subjected to intensive bending stress particularly when the optical fibers 1 in the optical coupler undergo the residual stress of the first and second adhesive agents 8 and 9 and/or the tensile stress generated as the first and second adhesive agents 8 and 9 are expanded or contracted due to temperature fluctuations.

Thus, the exposed optical fiber sections 4' are apt to become degraded at the partions a to consequently increase the optical transmission loss and can eventually become ruptured to render the optical coupler totally useless.

SUMMARY OF THE INVENTION

In view of the above identified technological problem of the prior art, it is therefore the object of the present invention to provide an optical coupler that can make the portions of the exposed optical fiber sections adjacent to the first adhesive agent free from intensive bending stress.

According to the invention, the above object is achieved by providing an optical coupler comprising:

exposed optical fiber sections formed by removing the coating layer of each of a plurality of coated optical fibers for a given length;

a welded optical fiber section formed by welding together and stretching portions of said exposed optical fiber sections;

an inner reinforcing member accompanying said welded optical fiber section; and an outer reinforcing member housing said exposed optical fiber sections, said welded optical fiber section and the end sections of the coating layers;

said inner reinforcing member and said exposed optical fiber sections being rigidly held to each other by means of a first adhesive agent;

said outer reinforcing member and said exposed optical fiber sections or said coating layers being rigidly held to each other by means of a second adhesive agent;

said optical coupler being characterized in that: portions of the exposed optical fiber sections located immediately adjacent to and outside the respective clots of the first adhesive agent as viewed from the welded optical fiber section are coated by a third adhesive agent having a Young's modulus smaller than that of the first adhesive agent.

As pointed out above, in an optical coupler according to the invention, portions of the exposed optical fiber sections adjacent to the first adhesive agent are coated with a third adhesive agent having a young's modulus smaller than that of the first adhesive agent.

Thus, if the exposed optical fiber sections in the optical coupler are subjected to bending stress, the stress is dispersed by the third adhesive agent having a Young's modulus smaller than that of the first adhesive agent and hence the portions of the exposed optical fiber sections adjacent to the first adhesive agent are kept free from intensive bending stress, Consequently, the exposed optical fiber sections are protected against degradation and eventual rupture at these portions.

DETAILED DESCRIPTION OF THE PREFERRED

Now, the present invention will be described in greater detail by referring to the accompanying drawings that illustrate preferred embodiments of the invention.

Figure 1:
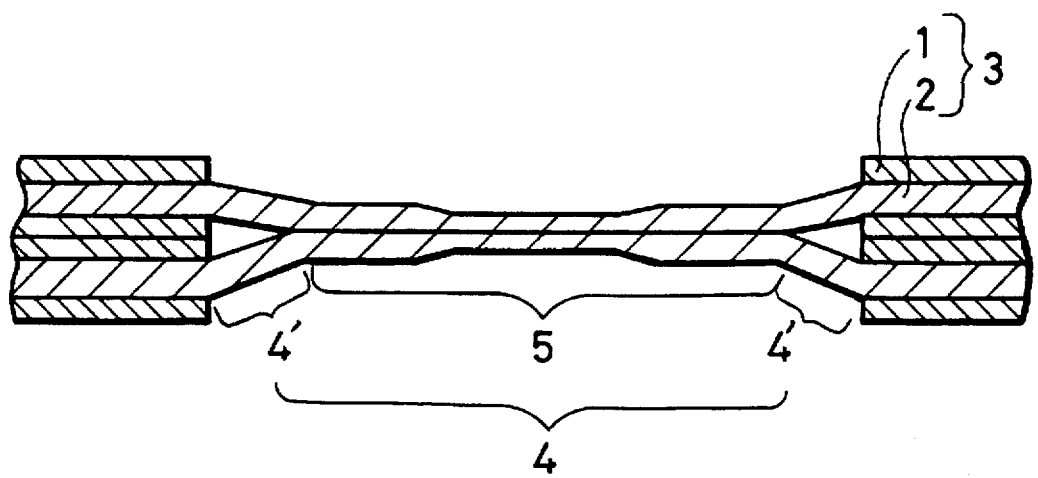
FIG. 1 is a transversal cross sectional view of an optical fiber cable to which a first embodiment of optical coupler according to the intention is applicable.

FIG. 1 shows an optical fiber cable realized by welding and stretching a plurality of optical fibers and FIGS. 2 through 5 illustrate a first embodiment of optical coupler according to the invention and applicable to an optical fiber cable as shown in FIG. 1.

Referring to FIG. 1, an optical fiber cable comprises a plurality of (two in FIG. 1) optical fibers 1, each of which is provided with a coating layer 2 typically made of a resin material capable of beingset by ultraviolet rays and removed for a given length to produce an exposed optical fiber section 4. The two optical fibers are welded and stretched at part of the exposed optical fiber sections 4 to form a weldedoptical fiber section 5. Note that the portions of the exposed optical fiber sections 4 that are not welded are referred to as exposed optical fiber sections 4' hereinafter for the sake of convenience.

Figure 2:
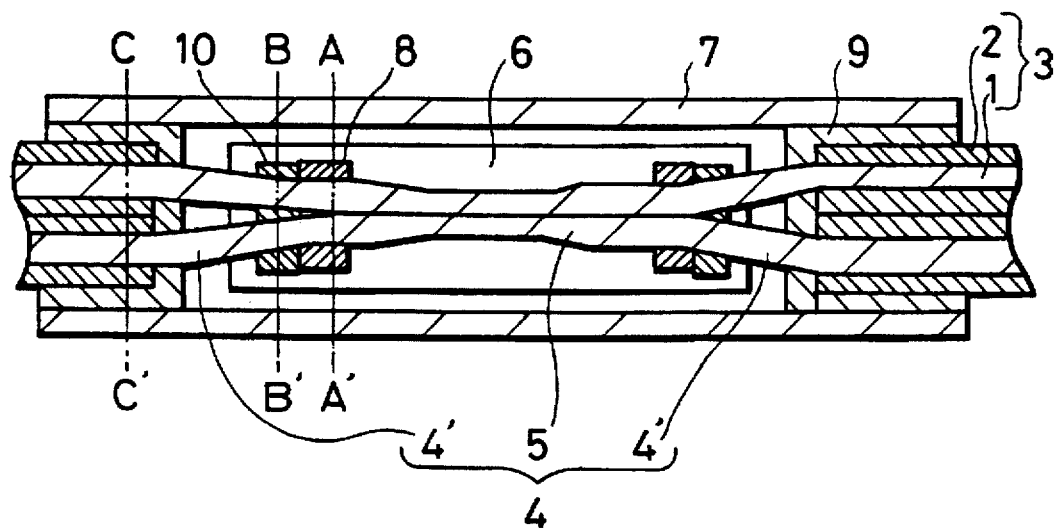
FIG. 2 is a transversal cross sectional view of the first embodiment of optical coupler according to the invention.
Figure 3:
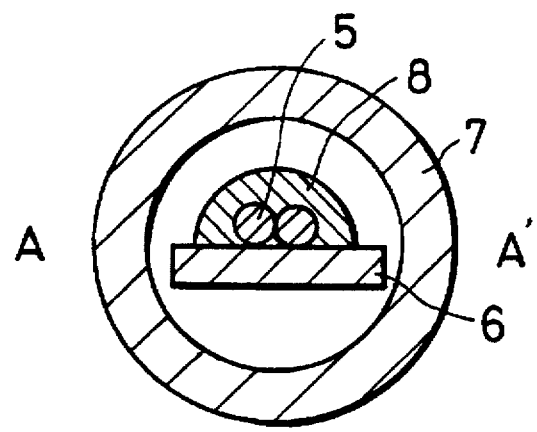
FIG. 3 is a longitudinal cross sectional view of the first embodiment of optical coupler taken alone line A–A' in FIG. 2.

Referring now to FIG. 2, in the first embodiment of optical coupler, the welded optical fiber section 5 is rigidly held to a panel-shaped inner reinforcing member 6 that is typically made of glass by means of a first adhesive agent 8 that is typically made of a resin material (having a Young's modulus of 70 kgf/mm²) capable of being set by ultraviolet rays as shown in FIGS. 2 and 3.

Figure 4:
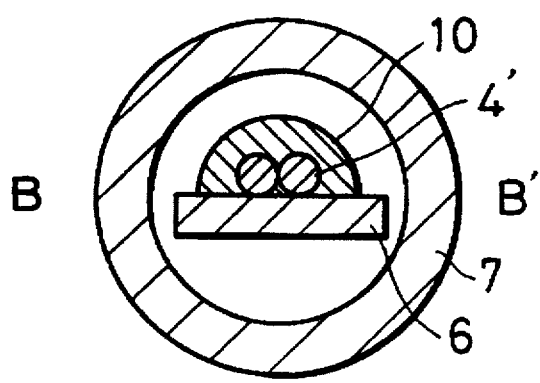
FIG. 4 is a longitudinal cross sectional view of the first embodiment of optical coupler taken along line B–B' in FIG. 2.

As shown in FIG. 4, portions adjacent to the first adhesive agent 8 of the exposed optical fiber sections 4' are coated with a third adhesive agent 10 typically made of a resin material (having a Young's modulus of 0.1 kgf/mm² or 10 kgf/cm²) capable of being set by ultraviolet rays in order to alleviate the bending stress to which the portions may be intensively subjected to.

Note that the third adhesive agent 10 covers part of the inner reinforcing member 6 to bond the latter and the exposed optical fiber sections 4' together.

Figure 5:
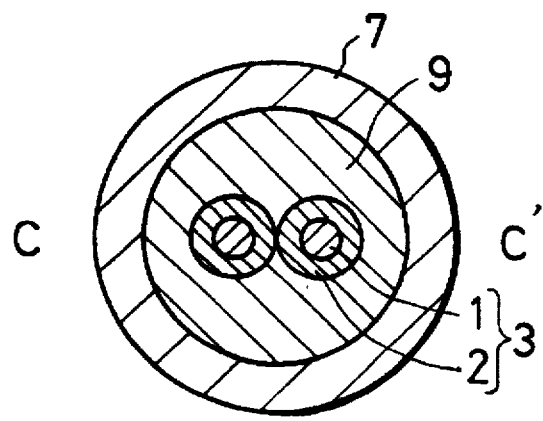
FIG. 5 is a longitudinal cross sectional view of the first embodiment of optical coupler taken along line C–C' in FIG. 2.

Additionally, the exposed optical fiber sections 4', the welded optical fiber section 5 and oppositely disposed end portions of the coating layers 2 are housed in a cylindrical outer reinforcing member 7 typically made of a plastic material and the outer reinforcing member 7 and the exposed optical fiber sections 4' and the oppositely disposed end portions of the coating layer 2 are bonded together by means of a second adhesive agent 9 capable of being set by ultraviolet rays as shown in FIG. 5.

Note that the outer reinforcing member 7 comprises two separable members that can be separated along the longitudinal direction of the optical fibers 1. For installing the optical coupler, an adhesive agent is applied to the contact planes of the separable members to bond the latter together with the exposed optical fiber sections 4', the welded optical fiber section 5 and the other related components securely housed in the outer reinforcing member 7.

In an experiment, an optical coupler according to the invention and having a configuration as shown in FIG. 2 and a known optical coupler having a configuration as shown in 9 were subjected to a pulling test, where the opposite ends of the optical fibers 3 were held and pulled away from each other to see the breaking strength of each of the optical couplers and the improvement in the breaking strength of the former optical coupler over the latter.

As a result, it was found that the breaking strength, of the known optical coupler was about 3.7N, whereas that of the Optical coupler of the present invention was as high as about 8.8N.

While the known optical coupler was broken in portions adjacent to the first adhesive agent 8 of the exposed optical fiber sections 4', the optical coupler of the present invention did not break in such portions.

Thus, the third adhesive agent 10 of the optical coupler of the present invention in FIG. 2 takes an important role af alleviating the bending stress to which the exposed optical fiber sections 4' are subjected so that consequently the these sections 4' show a remarkable improved breaking strength.

While the space within the outer reinforcing member 7 of the embodiment of FIG. 2 was left vacant, it is preferably filled with an adhesive agent to further rigidly secure the optical fibers there because the exposed optical fiber sections 4 may be brought under stress when impact is applied to the optical coupler to vibrate the exposed optical fiber sections 4.

Alternatively, only the inner reinforcing member 6 and the outer reinforcing member 7 may be bonded together by means of a fourth adhesive agent.

Figure 6:
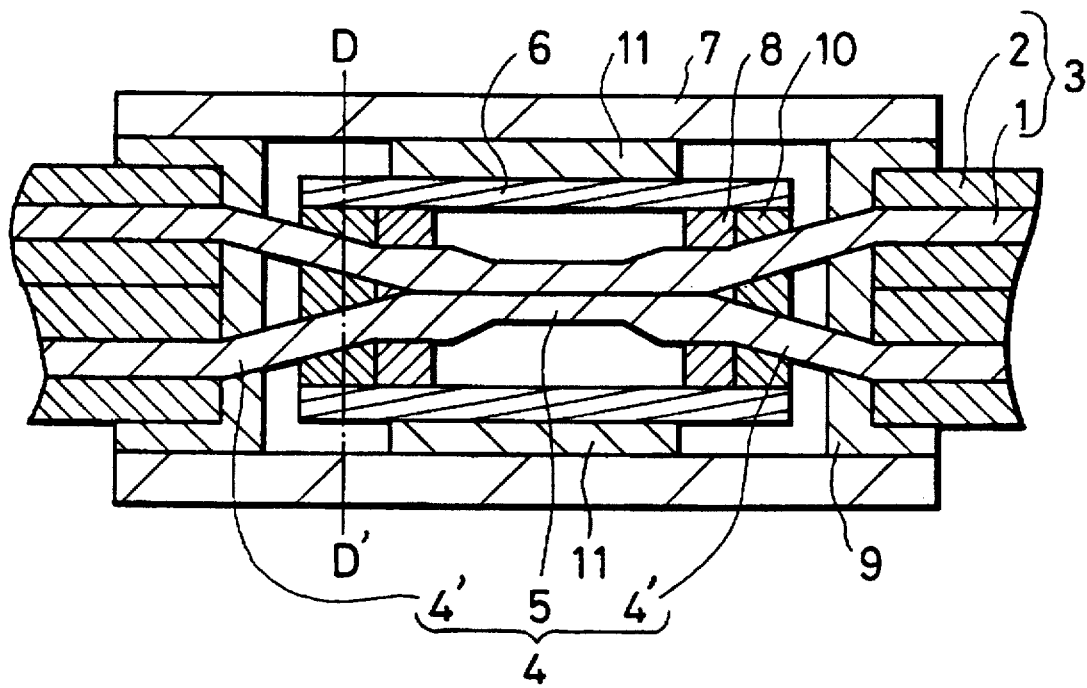
FIG. 6 is a transversal cross sectional view of a second embodiment of optical coupler according to the invention.
Figure 7:
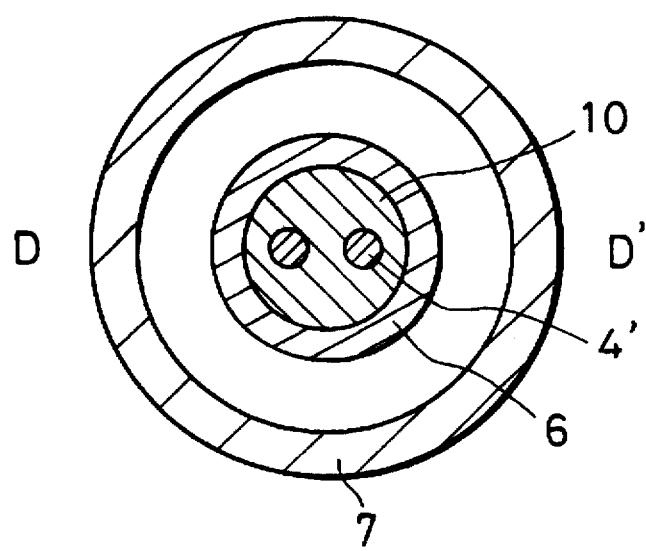
FIG. 7 is a longitudinal cross sectional view of the second embodiment of optical coupler taken along line D–D' in FIG. 6.
Figure 8:
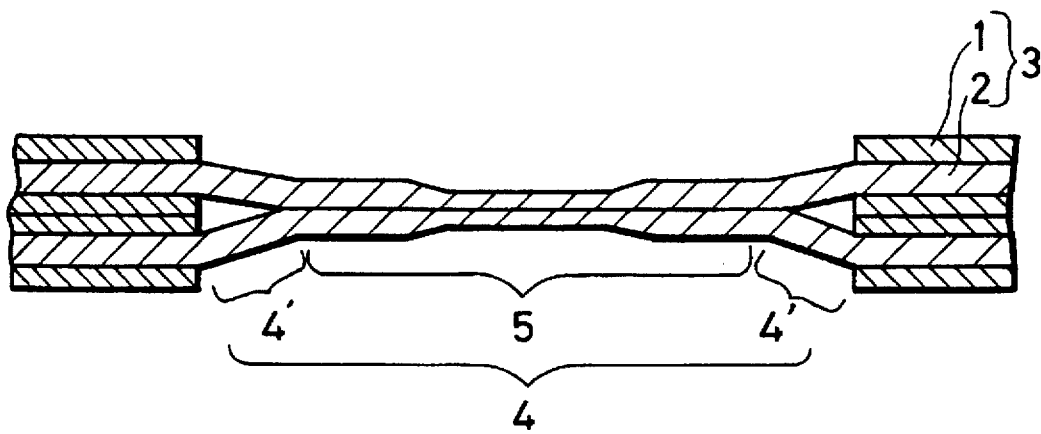
FIG. 8 is a transversal cross sectional view of an optical fiber cable to which a known optical coupler is applicable.
Figure 9:
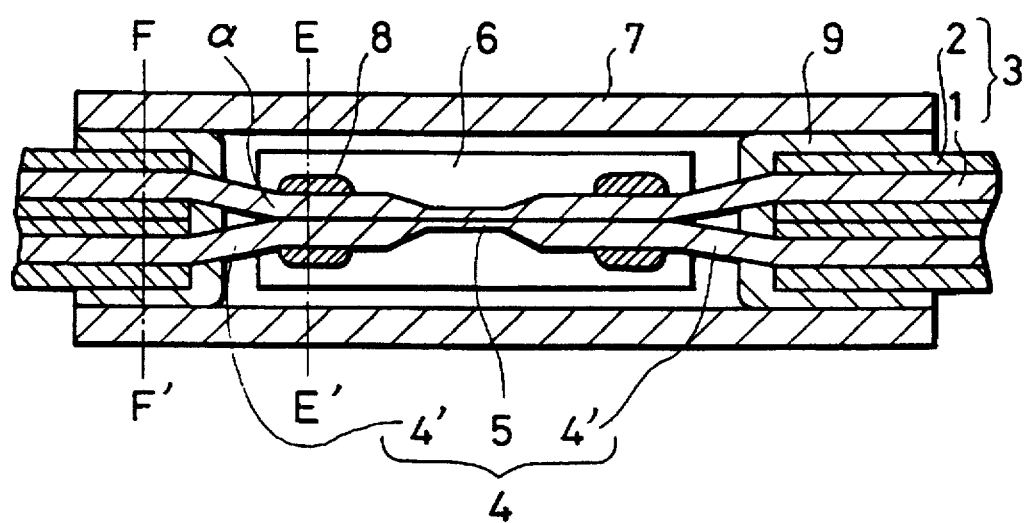
FIG. 9 is a transversal cross sectional view of the known optical coupler of FIG. 8.
Figure 10:
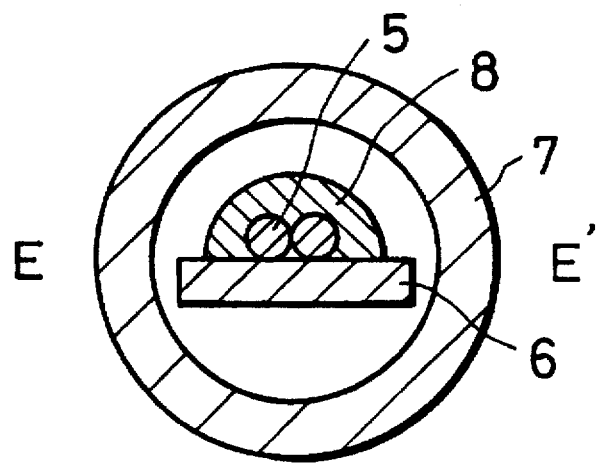
FIG. 10 is a longitudinal cross sectional view of the known optical coupler of FIG. 9 taken along line E–E' in FIG. 2.
Figure 11:
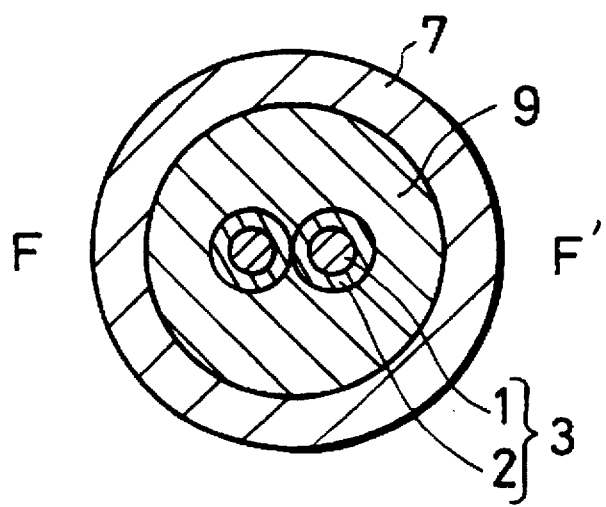
FIG. 11 is a longitudinal cross sectional view of the known optical coupler of FIG. 9 taken along line F–F' in FIG. 9.

While the inner reinforcing member 6 of the first embodimemt is panel-shaped, the inner reinforcing member of an optical coupler according to the invention is not limited thereto in terms of profile and it may alternatively comprise two separable members as in the case of the second embodiment of the invention illustrated in FIGS. 6 and 7.

While the first embodiment comprises two coated optical fibers 3, the number of coated optical fibers in an optical coupler according to the invention is not limited thereto and may alternatively be two or more than two.

The materials of the components of an optical coupler according to the invention are not limited to the above description and any appropriate materials may be used for them. For instance, while the adhesive agents including the first adhesive agent 8 of the first embodiment are made of respective resin materials that are capable of being set by ultraviolet rays, they may alternatively be made of thermosetting resin materials or some other adhesive resin materials.

Note, however, that the third adhesive agent 10 has to be made of a material having a low Young's modulus because it is required to disperse the bending stress applied to the exposed optical fiber sections 4'. The Young's modulus of the third adhesive agent 10 is preferably lower than 70 kgf/mm² and more preferably lower than 0.1 kgf/mm² or 10 kgf/cm₂.

[Advantage of the Invention]

As described above in detail, in an optical coupler according to the invention, portions of the exposed optical fiber sections are coated with a third adhesive agent having a Young's modulus lower than that of a first adhesive agent in order to prevent them from being subjected to bending stress so that the exposed optical fiber sections are protected against degradation and rupture that can take place in those portions.

What is claimed is:

1. An optical coupler comprising:

exposed optical fiber sections formed by removing the coating layer of each of a plurality of coated optical fibers for a given length;

a welded optical fiber section formed by fusing together and elongating portions of said exposed optical fiber sections;

an inner reinforcing member accompanying said fused optical fiber section; and an outer reinforcing member housing said exposed optical fiber sections, said fused optical fiber section and the end sections of the coating layers;

said inner reinforcing member and said exposed optical fiber sections being rigidly held to each other by means of a first adhesive agent;

said outer reinforcing member and said exposed optical fiber sections or said coating layers being rigidly held to each other by means of a second adhesive agent;

said optical coupler being characterized in that:

portions of the exposed optical fiber sections located immediately adjacent to and outside the respective clots of the first adhesive agent as viewed from the fused optical fiber section are coated by a third adhesive agent having a Young's modulus smaller than that of the first adhesive agent.

* * * * *